Feb. 23, 1932.    G. ALCZNAUER    1,846,298
ROTARY ENGINE
Filed June 24, 1926    2 Sheets-Sheet 1
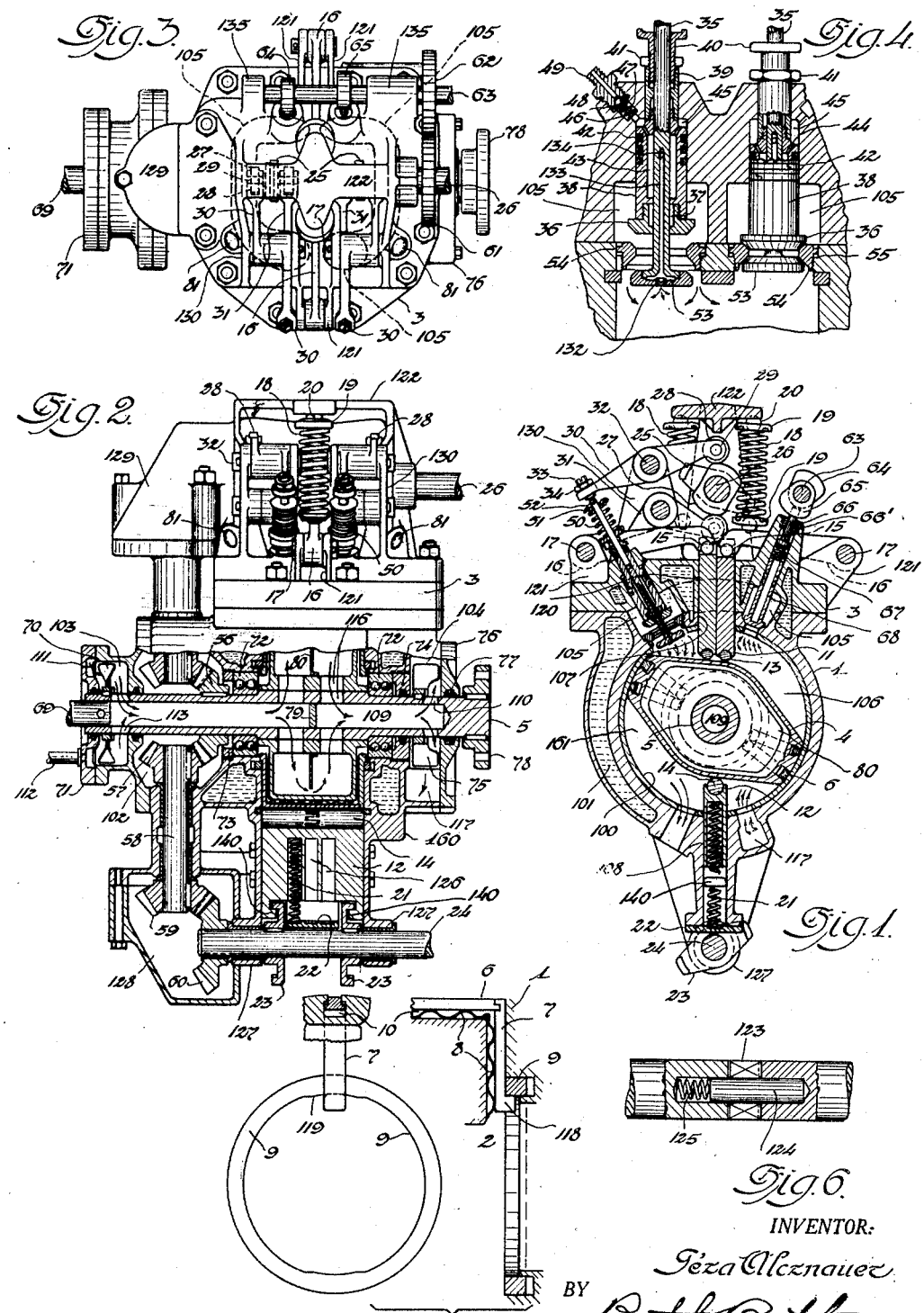
INVENTOR:
Géza Alcznauer
BY
ATTORNEYS.

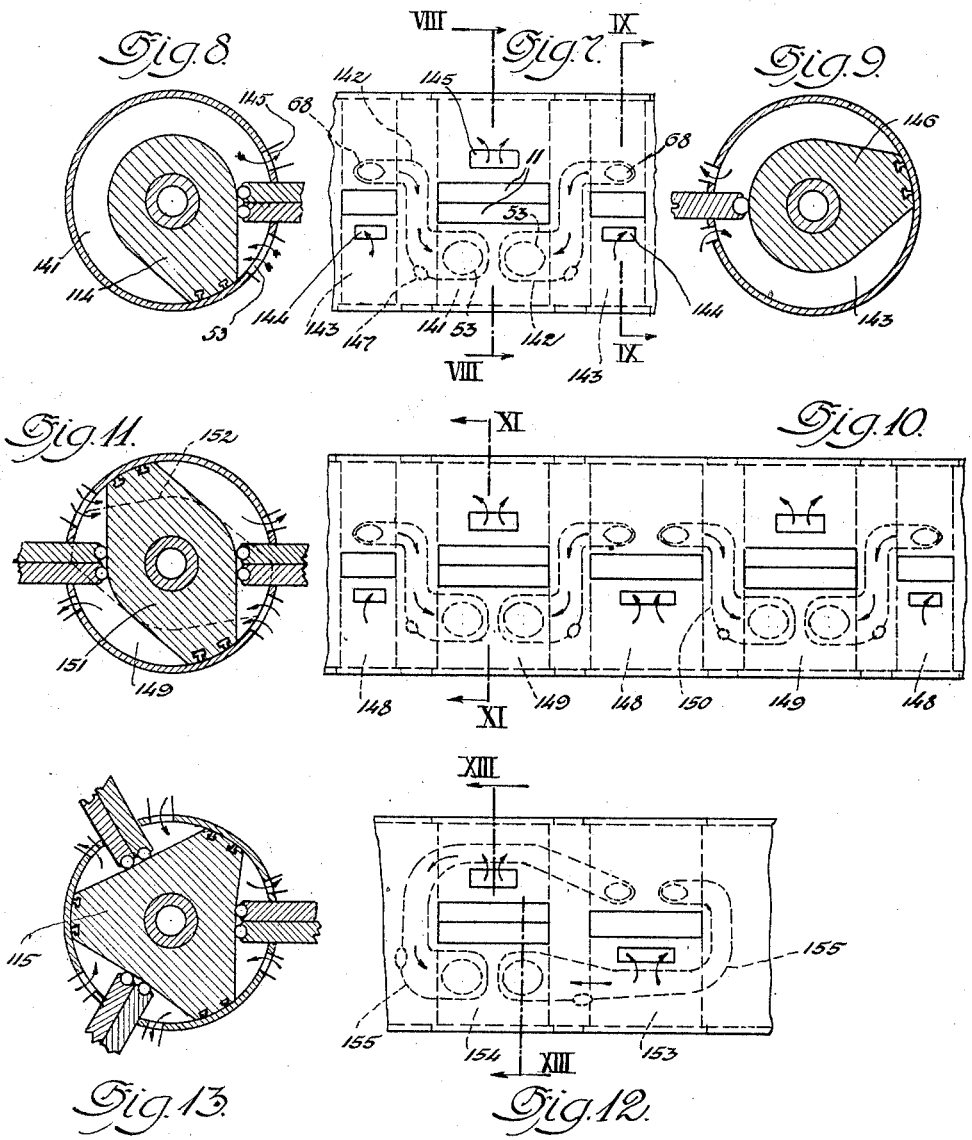

Patented Feb. 23, 1932

1,846,298

UNITED STATES PATENT OFFICE

GÉZA ALCZNAUER, OF DETROIT, MICHIGAN

ROTARY ENGINE

Application filed June 24, 1926. Serial No. 118,188.

This invention relates to a rotary gas engine and is capable of general use, particularly as a substitute for the usual type of piston and cylinder internal combustion engine.

My invention aims to provide a rotating power generating apparatus of minimum weight per horse power; less heat; a high speed range; greater crank shaft or rotor pressure or leverage, and generally a better and more useful rotary engine than heretofore provided utilizing an explosive mixture for power generating purposes. My invention may be characterized in the following particulars.

First, there are one or more stator chambers for one or more rotors, and axially of each stator chamber is a hollow shaft by which the rotary engine may be started. This same shaft is utilized as a conductor for a mixture of air and gas that is circulated through the rotor for heat absorbing purposes, whereby the stator and rotor are cooled. To insure a better induction, draft or circulation than provoked by the suction of the rotor, accelerating fans or other induction devices are employed together with certain partitions and passages and the admixture of air and gas is placed in a better condition for combustion purposes by absorbing any latent heat.

Second, the stator includes one or more slidable abutments or partitions which are adjustable relative to the rotor so as to provide the stator chambers. The divisions of the stator chamber are associated with valves adjacent at least one of the partitions.

Third, there are novel inlet valves controlling the passage of an explosive mixture from ignition chamber into the stator chambers. The valves are operatable by a cam and rocker mechanism all compactly assembled relative to the stator, so that for certain uses the rotor gas engine will occupy a comparatively small space.

Fourth, a cooling agent, as water, is used in connection with the inlet valves and the water converted into steam which is injected into the stator chambers to expand therein and cooperate with the pressure of the explosive mixture in imparting rotation to the rotor. The steam enriches the exploded mixture, does not interfere with ignition, and prevents decarbonization within and above the stator and rotor. The valves being cooled by the conversion of water into steam have greater life than the usual type of tappet valve.

Fifth, in a rotary engine it is essential that packing be used and this invention includes a novel rotor packing which insures a high degree of efficiency in connection with the engine.

Sixth, my power generating apparatus includes a stator chamber containing a rotor which divides the stator chamber so that one part thereof may be utilized for power purposes and the other side for compression purposes. The explosive mixture may be forcibly delivered to the compression part of the stator chamber to be compressed by the rotor and delivered to an ignition chamber and it is by such circulation of the explosive mixture that heat is absorbed and the explosive mixture placed in condition for combustion.

Seventh, the compressed explosive mixture is preignited in the ignition chamber, after all valves are closed, and kept in such a state for a fraction of a second, when the burning mixture reaches its highest point of combustion. The gases are permitted to enter the expansion chamber and produce power by pushing or turning the rotor. This is attained by employing two ignition chambers to every expansion and compression chamber, so that while one ignition chamber is emptying or discharging its exploded charge into the expansion chamber, the other ignition chamber is being filled by the compression chamber with a fresh charge. The time of ignition is arranged by means of an ignition timer for a desired speed of the rotor.

Other advantages are to be gained by the novel construction to be hereinafter described and then claimed, and reference will now be had to the drawings, wherein Figure 1 is a vertical cross sectional view of the rotary engine;

Fig. 2 is a side elevation of the apparatus with the lower part thereof in longitudinal section;

Fig. 3 is a plan of the gas power generating apparatus;

Fig. 4 is an enlarged vertical sectional view of the inlet valves;

Fig. 5 shows enlarged detail views of an adjustable or retractible packing;

Fig. 6 is an enlarged detail sectional view of a slide roller;

Fig. 7 is a diagrammatic side elevation showing the relation of compression chambers to a stator chamber;

Fig. 8 is a cross sectional view taken on the line VIII—VIII of Fig. 7 showing a single wing power rotor;

Fig. 9 is a similar view taken on the line IX—IX of Fig. 7 showing a compression rotor in an advanced position relative to Fig. 8;

Fig. 10 is a diagrammatic elevation showing a plurality of compression chambers relative to two rotor chambers;

Fig. 11 is a cross sectional view taken on the line XI—XI of Fig. 10, showing a double wing power rotor in full lines and a compression rotor in an advanced position by dotted lines;

Fig. 12 is a diagrammatic elevation showing a different arrangement of chambers with one power rotor and one compression rotor, and Fig. 13 is a cross sectional view on the line XIII—XIII of Fig. 12 showing a triple wing type of rotor.

Reference will first be had to Figs. 1, 2 and 3 showing the general compact design of the rotary engine, as it will be hereinafter termed, and as in the majority of rotary engines there is a multi-part stator housing 1 provided with a chamber which may have a suitable lining 100. The chamber formed by the lining and hereinafter called the "stator chamber" is cylindrical and the housing 1 is preferably formed with a water jacket 101, an end gear and lubricant chamber 102, fan chambers 103 and 104, ignition chambers 105, and slideways 107 and 108.

The fan chambers 103 and 104 are coaxially of the gear chamber 102 with the gear chamber interposed between the fan chamber 103 and the stator chamber. Between the stator chamber, the fan chamber 104 and the gear chamber 102 are bearings 72, retaining rings 73 and packing rings 74 all of which are used on account of a hollow shaft 5 being journaled in the bearings 72 and extending axially of the stator chamber. One end of the hollow shaft 5 extends through an end plate 76 carried by a housing cover or end wall 160 and provided with packing 77. This end of the shaft has a power take off collar or coupling 78 on its end and a fan 75 within the chamber 104 which communicates with the port 109 of the shaft by a series of slots 110. The opposite end of the shaft is journaled in a head 71 closing the fan chamber 103 and said head has slots or suitable air intake connections 111 so that a fan 70 mounted on the shaft 5 may entrain air to commingle with an explosive mixture admitted to the head 71 from a suitable carbureter connection 112. A suitable starting shaft or connection 69 is mounted in the port 109 of the shaft 5 and said port communicates with the fan chamber 103 by virtue of one or more slots 113.

On the shaft 5, within the stator chamber is a double wing rotor 4 which is preferably hollow, but may be of a one wing type 114, as shown in Fig. 8, or a three-wing type 115, as shown in Fig. 13. The rotor 4 divides the stator chamber into power side 161 and a compression side 106 and in all instances the rotor is hollow and has its interior provided with a partition 80 dividing the rotor into two chambers or a sinuous passage which communicates with the port 109 by openings 116 in the shaft 5 and the hub portion of the rotor 4. A partition 79 is mounted in the shaft port 109, thus dividing the shaft, whereby the admixture of gas and air entering the hollow shaft from the fan chamber 103, is caused to enter the rotor 4, cool the rotor by absorbing heat, place the admixture in better condition for combustion, and permit the fan 75 to force the heated admixture from a manifold passage 117 of the engine. This manifold passage 117 is adapted to deliver the admixture to the compression side 106 of the stator chamber where it is compressed and forcibly delivered by the rotor 4, to the ignition chambers 105. As hereinafter pointed out, there may be a plurality of rotor chambers for power rotors, and each chamber is served by the ignition chambers 105. Obviously an engine may be built for various duties and consequently I do not care to confine my invention to any particular arrangement of chambers by which power and compression sides of a rotor chamber may be operatably connected.

Associated with the double wing rotor 4 is a novel packing shown in Figs. 1 and 5. The extremities of the rotor wings and the end walls of said wings are provided with dove-tail channels 10 for interlocked packing end strips 6 and side strips 7 which are suitably held against the lining 100 and end walls of the stator chamber by the expansive force of one or more springs located in the channels 10. The strips 6 and 7 are interlocked to facilitate assembling and said strips are dovetailed, inverted T-shape or otherwise shaped in cross-section so as not to become accidentally displaced relative to the extremities or tips of the rotor wings. In other words, the rotor may be a bench assembled structure that may be quickly mounted on the shaft 5 within the housing 1, which is of such construction that one or more rotors can be assembled according to the number of stator chambers. There are times when it is desirable to retract the packing strips or bars 6 and for this purpose the end walls of the stator chamber are provided with inset cam rings 9 engageable by the ends 118 of the strips 7. The cam rings 9 have opposed strip actuating portions 119 so that the packing strips or bars 6 will be retracted when the rotor 4 is in a predetermined position, as will hereinafter appear.

Suitably mounted on the housing 1 is a valve head 3 which has a water jacket or chamber adapted to communicate with the water jacket 101 of the housing 1. The valve head 3 is formed with a slideway 120 communicating with the slideway 107 and in these slideways are slides 11 arranged side by side so as to form a substantially thick reciprocable vane or slide, one bracing the other, with the inner ends thereof provided with packing rollers 13 normally engaging the rotor 4 and adapted to prevent violent contact therewith. The outer ends of the slides 11 are engaged by anti-frictional rollers 15 and these rollers are loosely engaged by rocker arms 16 pivotally mounted on pins 17 carried by brackets or bearings 121 forming part of the valve head 3. The rocker arms 16 are in opposed relation and are normally depressed by the expansive force of coiled springs 18 which have the end convolutions thereof mounted in cup retainers 19. The cup retainers are engaged by balls, or fulcrum members 20 engaging the rocker arms 16 and a bearing frame 122 carried by the valve head 3, so that said springs may be self-adjusting relative to the holding means thereof.

Diametrically opposite the slides 11 is another slide or abutment 12 slidable in the way 108 of the housing 1 with its inner end provided with a roller 14 normally engaging the rotor 4. The rollers 13 and 14 may be self elongating when made of two sections, as shown in detail in Fig. 6. The roller sections may have interlocking ends 123, a dowel pin 124 and an expansion spring 125, the latter tending to separate the roller sections and compensate for expansion and contraction in connection with the rollers. The slide 12 is held in engagement with the rotor by one or more springs 21 arranged in pockets 126 provided therefor in the slide and said springs may be supported by an end plate 22 suitably attached to the housing 1. The slide 12 is adapted to be retracted relative to the rotor 4 by cams 23 mounted on a shaft 24 journaled in bearings 127 forming part of the housing 1 and the end wall or cover 160. The cams operatively engage the slide 12, as at 140, and gearing is employed for driving the shaft 24 and other shafts from the main shaft 5. The shaft 24 has one end thereof provided with a beveled gear 60 meshing with the beveled gears 59 on a shaft 58 provided with a beveled gear wheel 57 meshing with a beveled gear wheel 56 on the shaft 5. The beveled gear wheels 56 and 57 are within the gear chamber 102 and the beveled gear wheels 59 and 60 are within a gear housing 128 suitably supported from the housing 1. Obviously the slide 12 will be reciprocated in timed relation to rotation of the rotor 4 within the stator chamber.

The bearing frame 122 supports a cam shaft 26 and a gear housing 129, said cam shaft being driven from the beveled gear 56 of the shaft 5 by gearing corresponding to that which drives the shaft 24. On the cam shaft 26 are cams 27 engageable with anti-friction rollers 28 supported by pins 29 on the inner ends of rocker arms 30, said rocker arms being pivotally mounted on a pin 32 supported by a bearing 130 from the valve head 3. The rocker arms 30 are connected to the inner valves 53 and there are additional rocker arms 31 associated with outer valves 36, the rocker arms being actuated by cams 27 on the shaft 26. Cams 25 on the shaft 26 are adapted to actuate the slides 11 against the expansive force of the springs 18.

Reference will now be had to the valve construction of the engine, as best shown in Figs. 1 and 4. At the juncture of the ignition chambers 105 with the stator chamber there are valve seats 54 suitably mounted in the housing 1 and if necessary packed, as at 55. The valve seats 54 are double and serve inner and outer valves designated 36 and 53 respectively. The outer valves 36 operate in the ignition chambers 105 and said valves approximate the diameter of piston bodies 38 supporting said valves and provided with packing rings 42 so that said outer reciprocable valves may slide in pump chambers 45 and counterbalance the gas pressure of the ignition gas. For sliding these valve piston bodies 38, the outer ends of said bodies are reduced and mounted in packing housings 39 slidable in reduced outer ends of the pump chambers 45. The packing housings are slidable in the valve head 3 and connected to said packing housings by nuts 41 are spring abutments 40, and these abutments are engageable with bell cranks or rocker arms 31 pivotally mounted between the bearing brackets 130. The bell cranks or rocker arms 31 are roller equipped for engagement with cams 27 on the shaft 26. It is by virtue of these cams that the valve piston bodies 38 are reciprocated and besides seating the valves 36 produce a pumping action in the pump chambers 45.

The inner valve 53 of the valve stems 35 extending through the piston bodies 38, the housings 39 and the retaining members 40.

The outer end of each valve stem is adjustably connected by a screw 33 and a lock nut 34 to the outer end of the rocker arm 30. On the valve stem 35 is a spring retainer 51 held in position by a pin 52 and a coiled compression spring 50 encircles the valve stem between the spring retainer 51 and the member 40, so that the expansive force of this spring tends to seat the valve 36, thus moving the piston body 38 in one direction, while the cam shaft 26 moves the piston body in an opposite direction, that of opening the valve 36. This operation may be reversed so that the spring 50 opens the valve and the cam shaft closes the valve.

Each of the inner valves 53 has axial steam outlet ports 132 communicating with a passage 133 axially of the valve stem 35. The inner end of the passage 133 has lateral ports 134 communicating with a cooling chamber 43 in the piston body 38 and these lateral ports are automatically closed by the piston body when the inner and outer valves are closed. The cooling chamber 43 communicates with the pump chamber 45 by ports 44. Communicating with the pump chambers 45 are pockets 46 for springs 47 holding check valves 48 normally closed. The check valves 48 control the inlet of water through connections 49 from a suitable source of water supply. Considering Fig. 4, a down stroke of the valve piston body 38 unseats the check valve 48 and admits water to the pump chamber 45 which has a cooling effect on the valve head. An upstroke of the valve piston body 38 closes the check valve 48 and forces the water through the ports 44 into the cooling chamber 43 from where it finds its way through ports 134 into the passages 133 of the valve stem 35 and eventually reaches the outlet ports 132 as steam. By the water being converted into steam it has naturally absorbed considerable heat from the inner and outer valves and commingles with the exploded mixture from the combustion chamber 105 and adds to the beneficial propulsion or expansive action in the rotor chamber. The steam also has a scavenging action and I attach considerable importance to the manner in which the valves are cooled and steam generated to commingle with the explosive mixture.

The injected steam will not interfere with the ignition system since it is discharged away from the ignition chambers and cannot contact with spark plugs or other ignition devices whereby there might be a short circuit.

Communication between the ignition chambers 105 and the compression side 106 of the rotor chamber is controlled by valves 68 normally sealed by coiled expansion springs 67 engaged by plugs 66 in guides 66'. Since the rotor compresses the explosive mixture in the compression side 106 of the stator chamber, gradually increasing pressure will tend to open both valves but the opening of said valves is controlled by a cam mechanism. The arrangement is such that the valves may alternately open so that the ignition chambers will be charged one at a time and one always ready for ignition after its valve is closed. The plugs 66 are engaged by cams 64 and 65 which are mounted on a shaft 63 provided with a gear wheel 62 meshing with a gear wheel 61 on the shaft 26 (see Fig. 3). The cam shaft 63 is supported in suitable bearings 135 of the valve head 3. The housing 1 or the valve head 3 is provided with spark plug sockets 81 so that spark plugs (not shown) may communicate with the ignition chamber 105 and ignite the explosive mixture for driving the rotor 4.

Reference will now be had to Figs. 8 to 13 inclusive and while these views are more or less diagrammatic, it is believed that the same will materially assist in an understanding of the operation of the engine and the manner in which it may be enlarged for various duties. In Figs. 7 and 8 there is a stator power chamber 141 having passages 142 communicating with stator compression chambers 143. The chambers 143 have air and gas intake ports 144 and the chamber 141 has an exhaust port 145. In all of these chambers are rotors and slides. In the power chamber 141 is the rotor 114 normally engaged by double slides, as in Fig. 8, and in each of the chambers 143 is a compression rotor 146 engaged by a single slide. The passages 142 serve as ignition chambers and spark plugs or other ignition devices 147 are in proximity to the discharge end of said passages.

In Figs. 10 and 11 there are compression chambers 148, power or expansion chambers 149, and the necessary communicating passages or ignition chambers 150. Fig. 11 clearly shows a power rotor 151 in one of the chambers 149 and a compression rotor 152 in one of the chambers 148. These double wing rotors are served by single or double slides.

In Fig. 12 there is a compression chamber 153 and a power or expansion chamber 154. In this instance the passages or ignition chambers 155 are arranged to establish communication between the chambers and the triple rotors 115, with double slides may be advantageously used in this arrangement, as shown in Fig. 13.

It is thought that the operation and utility of the engine will be apparent without further description, and while in the drawings there is illustrated the principle involved in my invention, it is to be understood that the construction of the engine is susceptible to such changes as are permissible by the appended claim.

What I claim is:—

In a rotary power generating apparatus wherein a rotor is driven in a stator chamber by an explosive mixture admitted to said stator chamber; opposed slides extending from the wall of said stator chamber into engagement with said rotor and dividing said stator chamber into an expansion chamber and a compression chamber at opposite sides of each of said slides, combustion chambers formed in the apparatus adjacent the stator chamber divisions formed by one of said slides, double valves controlling communication between said combustion chambers and adjacent stator chamber divisions, each double valve including inner and outer valves, said inner valves being adapted to admit and vaporize water and discharge steam into the adjacent chambers when expanding, said double valves being timed to open said combustion chambers to expanding divisions of the stator chamber and to close said combustion chambers to divisions of the stator chamber under compression.

In testimony whereof I affix my signature.

GÉZA ALCZNAUER.